United States Patent
Lee (10) Patent No.: US 11,828,887 B2
(45) Date of Patent: Nov. 28, 2023

(54) RADIOACTIVITY MEASUREMENT METHOD AND RADIOACTIVITY MEASUREMENT SYSTEM

(71) Applicant: KOREA HYDRO & NUCLEAR POWER CO., LTD, Gyeongsangbuk-do (KR)

(72) Inventor: Seung Chan Lee, Daejeon (KR)

(73) Assignee: KOREA HYDRO & NUCLEAR POWER CO., LTD, Gyeongsangbuk-do (KR)

( * ) Notice: Subject to any disclaimer, the term of this patent is extended or adjusted under 35 U.S.C. 154(b) by 410 days.

(21) Appl. No.: 16/475,043

(22) PCT Filed: Jan. 2, 2018

(86) PCT No.: PCT/KR2018/000001
§ 371 (c)(1),
(2) Date: Jun. 28, 2019

(87) PCT Pub. No.: WO2018/124837
PCT Pub. Date: Jul. 5, 2018

(65) Prior Publication Data
US 2019/0331803 A1    Oct. 31, 2019

(30) Foreign Application Priority Data
Jan. 2, 2017   (KR) .................. 10-2017-0000293

(51) Int. Cl.
*G01T 1/167*  (2006.01)
*G01J 3/28*  (2006.01)
(Continued)

(52) U.S. Cl.
CPC ............. *G01T 1/167* (2013.01); *G01J 3/28* (2013.01); *G01T 1/1663* (2013.01); *G01T 1/36* (2013.01)

(58) Field of Classification Search
CPC .............. G01T 1/167; G01T 1/36; G01J 3/28
(Continued)

(56) References Cited

U.S. PATENT DOCUMENTS

2011/0121163 A1   5/2011  Kang et al.
2014/0158893 A1*  6/2014  Platt .................... G01T 3/085
                                                    250/370.05
(Continued)

FOREIGN PATENT DOCUMENTS

CN    103064101 A    4/2013
JP    1152061       2/1999
(Continued)

OTHER PUBLICATIONS

English Machine Translation Nakahara JP 2005-249667 (Year: 2005).*

(Continued)

*Primary Examiner* — David P Porta
*Assistant Examiner* — Carolyn Fin
(74) *Attorney, Agent, or Firm* — Occhiuti & Rohlicek LLP (57) ABSTRACT

The present invention relates to a radioactivity measurement method and a radioactivity measurement system. A radioactivity measurement method according to the present invention comprises the steps of: measuring radioactivity while performing energy scanning and temporal scanning; preparing a database from a time-energy-related data set obtained in result of the scanning; and obtaining a radioactivity measurement value of desired time from the database.

2 Claims, 7 Drawing Sheets

(51) Int. Cl.
*G01T 1/36* (2006.01)
*G01T 1/166* (2006.01)

(58) Field of Classification Search
USPC .................................................. 250/363.01
See application file for complete search history.

(56) References Cited

U.S. PATENT DOCUMENTS

2014/0303932 A1    10/2014  Snow et al.
2016/0161425 A1*   6/2016   Berezin ................. G01N 22/00
                                                324/638

FOREIGN PATENT DOCUMENTS

| | | |
|---|---|---|
| JP | 2000258538 | 9/2000 |
| JP | 2005249667 | 9/2005 |
| JP | 2015501928 | 1/2015 |
| KR | 1020110055870 | 5/2011 |
| WO | 2007075181 | 7/2007 |

OTHER PUBLICATIONS

English machine translation Kang et al. KR 1020110055870 (Year: 2011).*

* cited by examiner

RADIOACTIVITY MEASUREMENT METHOD AND RADIOACTIVITY MEASUREMENT SYSTEM

CROSS REFERENCE TO RELATED APPLICATIONS

This application is a National Phase under 35 U.S.C. 371 of International Application No. PCT/KR2018/000001 filed on Jan. 2, 2018, which claims priority to Korean Application No. 10-2017-0000293 filed on Jan. 2, 2017.

TECHNICAL FIELD

The present invention relates to a radioactivity measuring method and a radioactivity measuring system for measuring radioactivity at a high accuracy within a short time.

BACKGROUND ART

A conventional radioactivity measurement method using a detector involves directly measuring a sample or radioactive substance for measuring a total amount of radioactivity.

In this radioactivity measurement method, a total real-time accumulation of radioactivity should be obtained and analyzed to estimate a nuclide-based radioactivity value. Thus, this may cause inconvenience of having to wait until the total real-time accumulation of radioactivity should be obtained.

In particular, the conventional radioactivity measuring method may be problematic in particular when analysis results should be rapidly derived, since certain nuclides non-sensitive to radioactive decay have 2 to 3 days or larger of a measurement duration. For example, the long measuring time duration required in the conventional radioactivity measuring method is problematic, in case when it is necessary to analyze anomalies in the power plant via a rapid radioactive analyzing.

DISCLOSURE

Technical Problem

Therefore, a purpose of the present invention is to provide a method and system for measuring radioactivity at a high accuracy in a short time.

Technical Solution

In one aspect, there is proposed a radioactivity measurement method comprising: measuring radioactivity while performing energy scanning and time scanning; generating database from data sets about time-energy relationships obtained from the time scanning and energy scanning; and obtaining, from the database, a radioactivity measurement value at a desired time.

In one embodiment of the method, obtaining the radioactivity measurement value includes using a data random extraction technique.

In one embodiment of the method, the data random extraction technique includes a Monte Carlo technique.

In one embodiment of the method, the energy scanning is performed in a state in which a measurement energy range is divided into a plurality of energy bands having the same band width.

In one embodiment of the method, the time scanning is performed to count a number of times of radioactivity decays on a predetermined time duration basis and on each energy band basis.

In one embodiment of the method, the data sets constituting the database include 3,000 to 6,000 data sets.

In another aspect, there is provided a radioactivity measurement method comprising: measuring a nuclide-based radioactivity decay characteristic at each of a plurality of times during a first time period, thereby to form database; and using the database to estimate a nuclide-based radioactivity decay characteristic for a second time period after the first period time.

In one embodiment of the radioactivity measurement method, estimating the nuclide-based radioactivity decay characteristic includes using a data random extraction technique.

In still another aspect, there is proposed a radioactivity measurement system comprising: a radioactivity measuring unit; a scanning unit configured for performing energy scanning and time scanning in association with the radioactivity measuring unit; a database unit configured for generating database from data sets about time-energy relationships obtained from the scanning unit; and an extraction unit configured for extracting a radioactivity measurement value at a desired time using the database from the database unit.

In one embodiment of the system, the extraction unit uses a data random extraction technique to extract the radioactivity measurement value.

In one embodiment of the system, the data random extraction technique includes a Monte Carlo technique.

In one embodiment of the system, the energy scanning is performed in a state in which a measurement energy range is divided into a plurality of energy bands having the same band width.

In one embodiment of the system, the time scanning is performed to count a number of times of radioactivity decays on a predetermined time duration basis and on each energy band basis.

In one embodiment of the system, the data sets constituting the database include 3,000 to 6,000 data sets.

Advantageous Effects

In accordance with the present invention, a method and system for measuring radioactivity at a high accuracy in a short time may be realized.

MODE FOR INVENTION

The present invention will now be described in more detail with reference to the drawings.

The accompanying drawings are merely illustrative examples for the purpose of more specifically describing the technical idea of the present invention, and thus the idea of the present invention is not limited to the accompanying drawings. Further, the accompanying drawings may be exaggerated in size and spacing in order to describe the relationship between components.

The present invention is to shorten the measurement time and predict and quantify the final radioactivity value when radioactive samples in the power plant and radioactive samples in the environment are to be measured in terms of radioactivity levels, and various other radioactivity measurements are required.

According to the present invention, in order to shorten the measurement time in the conventional radioactivity analysis of urgent samples and samples with low radioactivity levels, random sampling and Monte Carlo simulations may be applied to the initial measurement data to estimate the last radioactivity value and calculate the last shape of the spectrum.

In the conventional measurement method, the measurement results were analyzed and evaluated after long measurement duration using a detector. In particular, when a long-term measurement is required, for example, for a low-level radioactivity sample, the measuring duration from one day to three days or longer may be required.

According to the present invention, time scanning is applied to this conventional measurement method. Thus, the characteristics of the nuclide-based radioactivity decay and the detection pattern of the detector are grasped and the initial measured data is formed into database. Using the created database may allow predicting the last measurement value, thereby calculating the measurement result within a short time.

According to the present invention, In the case of samples that are difficult to measure or which is not sensitive to the radioactivity decay, the radioactivity pattern is stored and the stored pattern is subjected to the Monte Carlo method such that the last value of the radioactivity measurement is estimated from data corresponding to about 3,000 to 10,000 seconds, and the measured value peak or the like of the detector is estimated. Thus, the last measured value is predicted in a short time or the measurement is completed in a short time.

According to the present invention, in order to store and utilize the radioactivity pattern as it is at the beginning of radioactivity measurement, time-scanning information about counting of the number of radioactivity decays per unit time (e.g. 1 second, 2 second, 5 second, etc.) are stored. Further, for each measurement, each energy-based information is stored separately on a unit energy spacing basis (e.g., 0.1 eV, 0.1 keV, 0.1 MeV, etc.).

When the stored information are collected for a certain period of time, the existing measurement spectrum and the radioactivity decay pattern information resulting from the time scanning accumulate to a significant level, such that database is created. In this connection, the certain period of time refers to a time duration sufficient to statistically represent, for example, a measurement pattern (or radioactivity pattern). This may be larger than 2,000 seconds, or larger than 3,000 seconds, or may refer to a time duration taken to collect more than 2,000 data or more than 3,000 data. More specifically, this certain period of time may include 2,000 to 10,000 seconds, 2,500 to 8,000 seconds, 2,500 to 6,000 seconds, or 3,000 to 5,000 seconds or may refer to a time duration taken to collect 2,000 to 10,000 data, 2,500 to 8,000 data, 2,500 to 6,000 data, or 3,000 to 5,000 data.

This database is used to predict and derive last measurements and last spectra corresponding to the last measurement time in the conventional measurement method.

When collecting information on the time scanning and energy scanning into a separate storage space at the same time as the initial measurement, the collected pattern information is randomly applied to the measured information. Thus, the measured spectrum and the further predicted spectrum are combined with each other, thereby to predict the last measurement result.

The time scanning and energy scanning information contains the decay characteristics of the radioactive substance or radioactive nuclide to be measured. The prepared database has a unique pattern reflecting the inherent characteristic of radioactivity representing the decay characteristic of the radioactive substance or radioactive nuclide to be measured.

When the database storing therein the unique pattern of the radioactivity decay is randomly generated by the Monte Carlo method, the characteristics of the radioactive substance or radioactive nuclide to be measured are simulated intact in randomly generating the database, and, thus, the spectrum of the last measurement result is generated in advance.

This greatly shortens the radioactivity measurement time, drastically shortens the analysis time, and optimizes the measurement.

In accordance with the present invention, the storage of the radioactivity pattern information by the Monte Carlo method may be performed into a separate storage unit. Time scanning and energy scanning may be performed at the same time.

Time scanning may refer to storing the number of radioactivity decays at a given time interval. The time scanning information may be stored with the energy scanning information. Energy scanning may refer to determining a range of the radioactivity decay energy that can be measured by the detector, dividing the energy of the range on a unit energy basis and configuring each divided energy as each channel.

For example, when the energy range is from 0 MeV to 3 MeV and the energy range is divided into 4000 channels for energy scanning, the unit energy may be 3 MeV/4000 channel, that is, 0.00075 MeV/channel. Thus, the unit energy band is 0.00075 MeV. Thus, the energy range is distributed up to 3 MeV on 0.00075 MeV basis.

When the energy division is completed, the number of the radioactivity decay corresponding to each energy band is counted in the corresponding energy channel. However, in order to maintain the counting characteristic, that is, the pattern, the count per unit time in each energy channel is created into database.

For example, converting counts and patterns of radioactivity decay corresponding to a 600 keV or 0.6 MeV energy channel into database may refer to creating database about the decay counts per each second, for example, such that, when the unit time is set to 1 second, twice decays for the first one second in the 0.6 MeV channel, then one time decay in the next one second, then three times decay in the next one second, then one time decay in the next one second, then twice decays in the next one second, then decay once in the next one second, and the three times decay in the next one second are stored.

Thus, the database has the decay frequency distributions as patterns of frequency of decays on one second basis, for example, the number of one decay frequencies in one second, the number of two decay frequencies in one second, the number of three decay frequencies in one second, the number of four decay frequencies in one second, and so on. This may be expressed as a statistical distribution. The statistical pattern may be determined when sufficient data is collected.

Thus, generating randomly database having sufficient statistical patterns may comply with the statistical pattern of radioactivity decays. In this manner, the radioactivity decay may be reproduced using the Monte Carlo method. When this method is extended to the last time point which the conventional measurement method requires, the last spectrum and the measured value can be derived.

Figure 1:
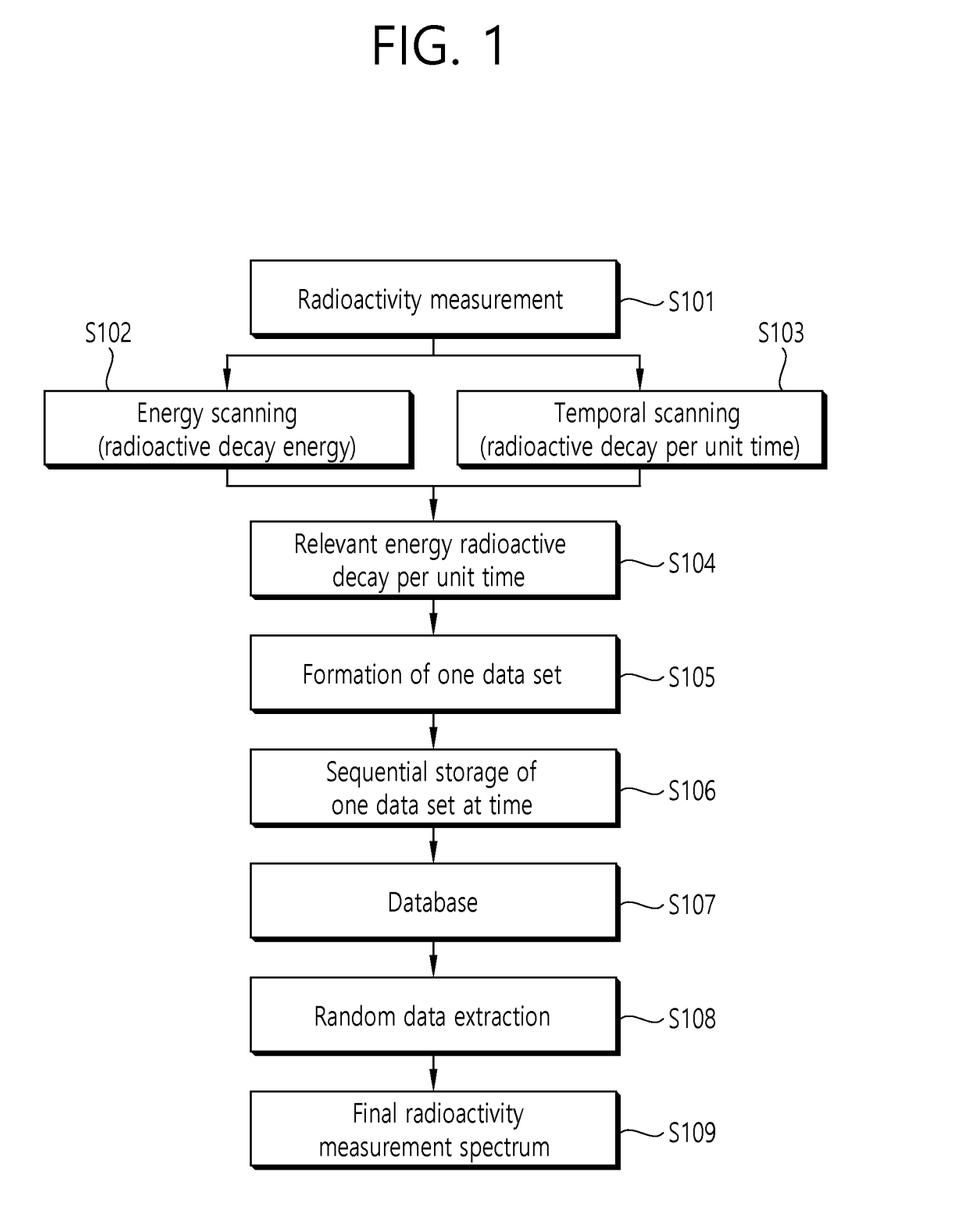
FIG. 1 is a flowchart showing a radioactivity measurement method according to one embodiment of the present invention.

Hereinafter, the present invention will be described in detail with reference to the drawings FIG. 1 is a flowchart showing a radioactivity measurement method according to one embodiment of the present invention.

First, the radioactivity of the sample is measured S101. This step means preparing the radioactivity measurement using a detector.

Next, energy scanning S102 and time scanning S103 are performed. In those steps, energy scanning is performed to store the energy of the radiation measured from the detector measuring the radioactivity based on the corresponding energy channel. Further, when the energy scanning is performed, time scanning is concurrently performed to measure the count (i.e., the radioactivity decay count) on a unit time basis.

In this step, the count and energy information measured on each unit time basis constitute a single data set S104.

Next, the data set having time scanning and energy scanning information is stored S105 to create database S107.

The database refers to a collection of data sets. The database includes a collection of sets of data, each set having information about the radiation energy and radiation counts measured per unit time as generated by the energy scanning and time scanning when radioactivity measurement is performed.

Next, the sequentially stored database is randomly extracted at S108. At this step, the information in the data set stored in the database contains the pattern of the radioactivity spectrum to be measured in an intact manner. Thus, random desired numbers of data are extracted randomly from the collection of data sets in the database and is added to the measurement value.

For example, when the unit time for the energy scanning and time scanning is one second, and measurement duration larger than 80,000 seconds is required, data is randomly extracted 80,000 times from the database. This may be equivalent to measurement for the measuring duration of 80,000 seconds. In this connection, Monte Carlo simulation techniques may be applied to random extraction.

Finally, the last spectrum is completed by the random extraction S109. The last spectrum may be completed by combining the measurement simulation result obtained from the random extraction process and the initial measurement spectrum.

Figure 2:
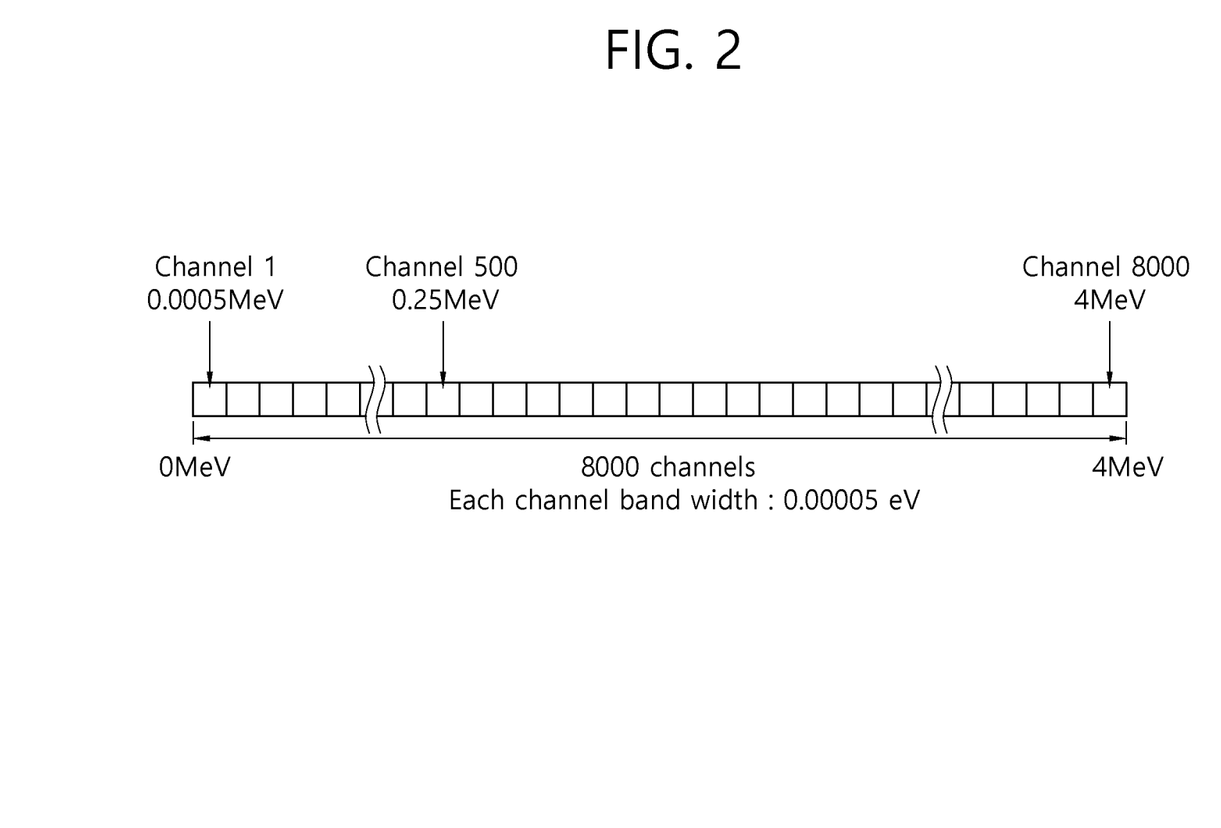
FIG. 2 is a diagram for explaining energy scanning in a radioactivity measurement method according to one embodiment of the present invention.
Figure 3:
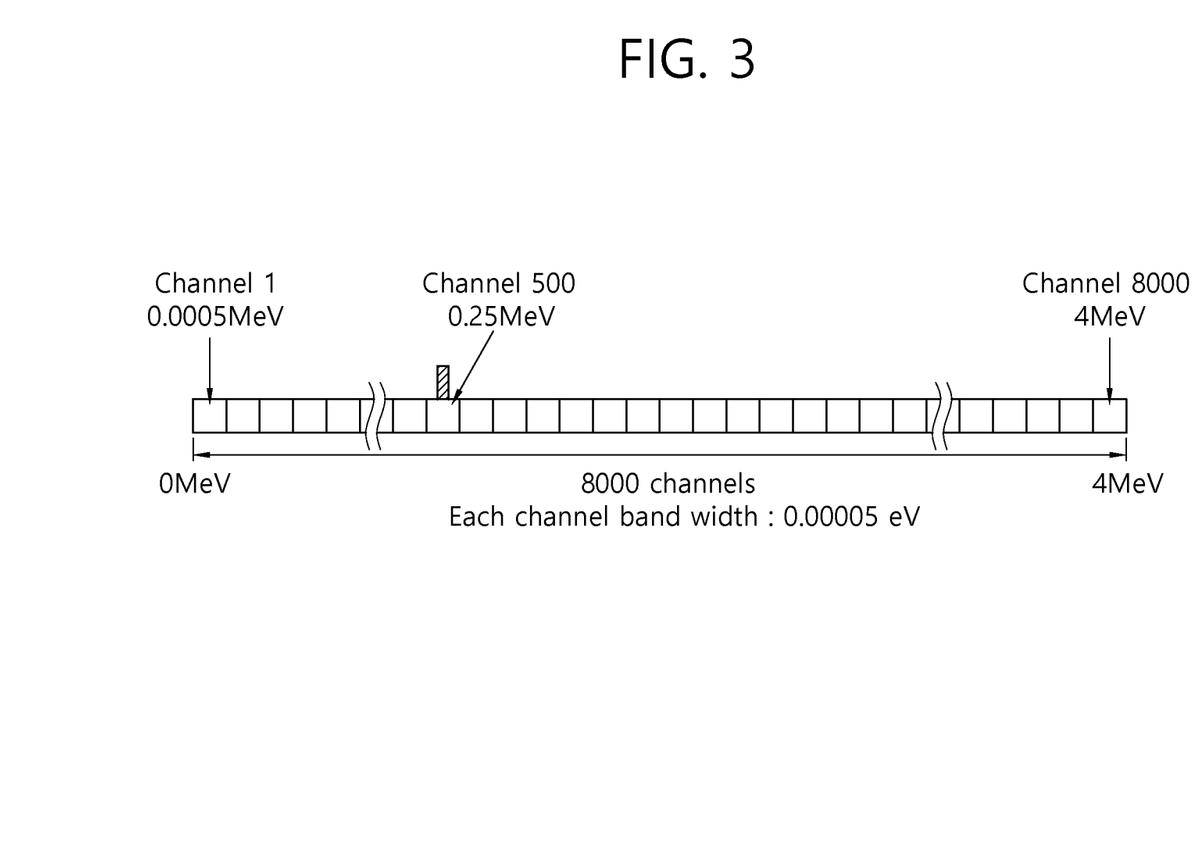
FIG. 3 is a diagram for explaining time scanning in the radioactivity measurement method according to one embodiment of the present invention.
Figure 4:
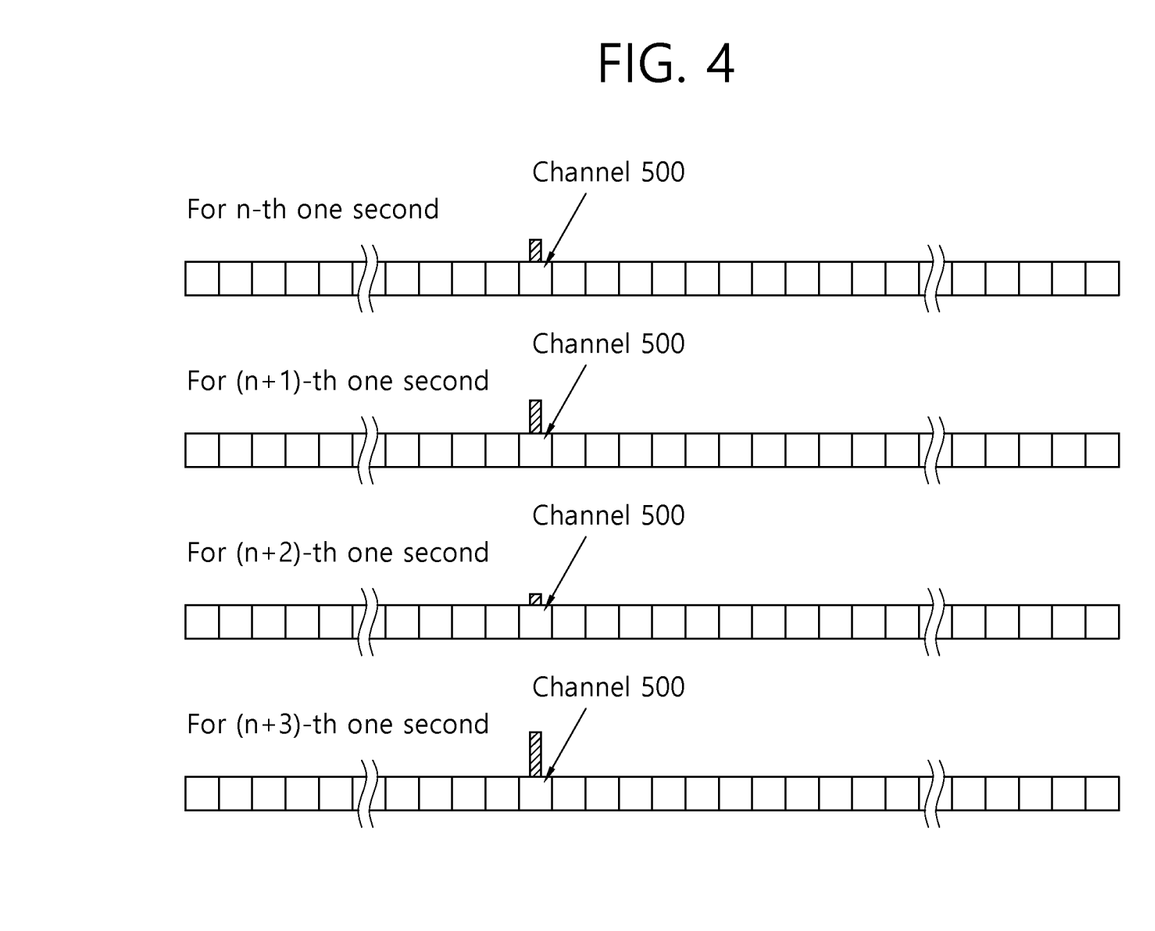
FIG. 4 is a diagram for explaining a method of scanning per unit time in a radioactivity measurement method according to one embodiment of the present invention.

Referring to FIG. 2 to FIG. 4, the energy scanning and time scanning will be described in detail.

FIG. 2 is a diagram for describing energy scanning in a radioactivity measurement method according to one embodiment of the present invention. FIG. 3 is a diagram for describing time scanning in a radioactivity measurement method according to one embodiment of the present invention. FIG. 4 is a diagram for describing a method of scanning per unit time in a radioactivity measurement method according to one embodiment of the present invention.

FIG. 2 depicts energy scanning, in which the total energy range of 0 to 4 MeV is divided into 8,000 energy channels. Since the total energy range is 0 to 4 MeV, the energy of one channel having a constant band is 0.0005 MeV. As the number of the constant bands (channels) increases, the energy level is constantly increased, so that the 500th channel becomes 0.25 MeV. Every time a radioactivity decay, a channel corresponding to decay energy is configured and energy scanning is performed.

FIG. 3 shows time scanning. The time scanning shows how the radioactivity decay of the corresponding energy is measured per unit time. The time scanning fully reflects the characteristics of the radioactivity decay expressed as a decay probability per unit time.

Assuming that the radioactivity energy level is 0.25 MeV, which is the 500th channel level, as shown in FIG. 3, each time when the radioactivity decay corresponding to the 500th 0.25 MeV occurs, this occurrence has been counted on the 500th channel. The spectrum as counted is, for example, spectrally configured per unit time using a red bar on the screen.

FIG. 3 shows the spectrum measured at a specific time. FIG. 4 illustrates the concept of time scanning in more detail.

FIG. 4 shows how time scanning of the radioactivity decay performed per each unit time is performed on the corresponding energy channel when applying the time scanning assuming a unit time of one second. The decay spectrum per each unit time for four seconds is shown in FIG. 4. After the fourth time unit, which is four seconds after a specific time, the time-scanning may continuously proceed on the corresponding energy channel for every unit time. Thus, a statistically meaningful data set is achieved when such time scanning is done from about 3000 to about 5000 times.

Figure 5:
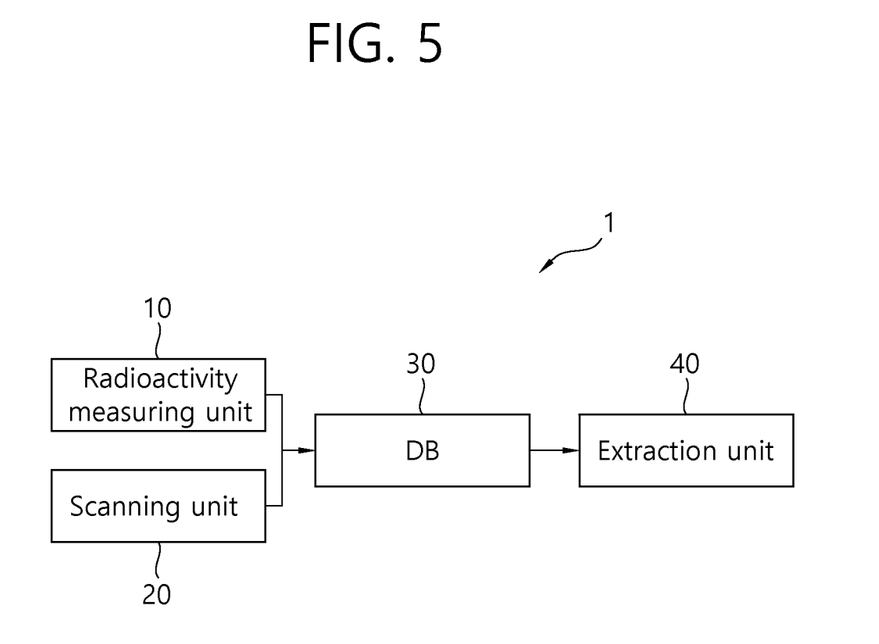
FIG. 5 shows a radioactivity measurement system according to one embodiment of the present invention.

FIG. 5 shows a radioactivity measurement system according to one embodiment of the present invention.

The radioactivity measuring system 1 includes a radioactivity measuring unit 10, a scanning unit 20, database 30 and an extraction unit 40. The radioactivity measurement system 1 may further include a user interface or output unit.

As described above, the data set obtained by the radioactivity measuring unit 10 and the scanning unit 20 forms the database 30. The extraction unit 40 generates the measurement spectrum using the database 30.

Hereinafter, the present invention will be described with reference to actual measurement results.

Figure 6:
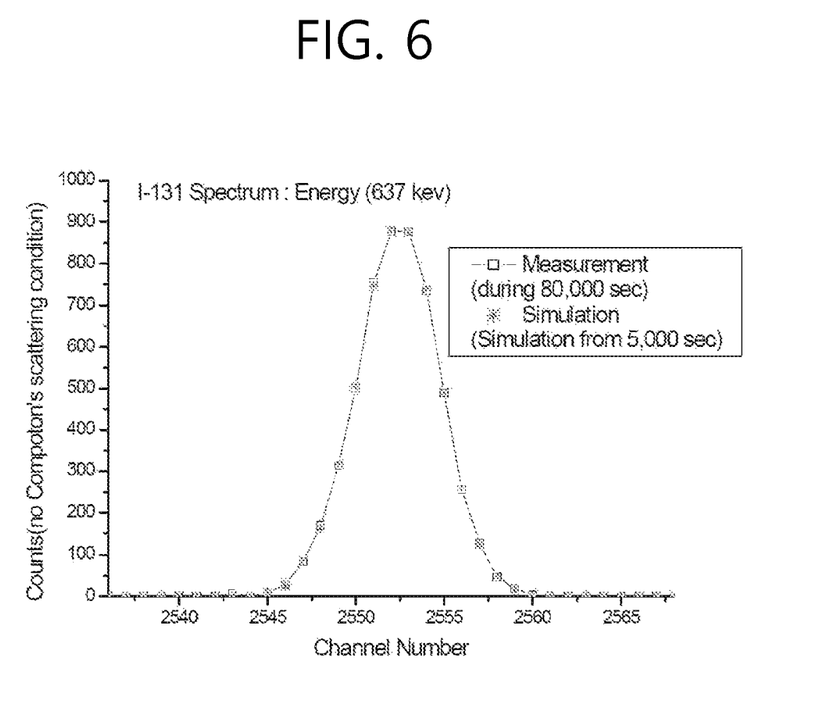
FIG. 6 and FIG. 7 show measured spectra obtained according to the present invention.
Figure 7:
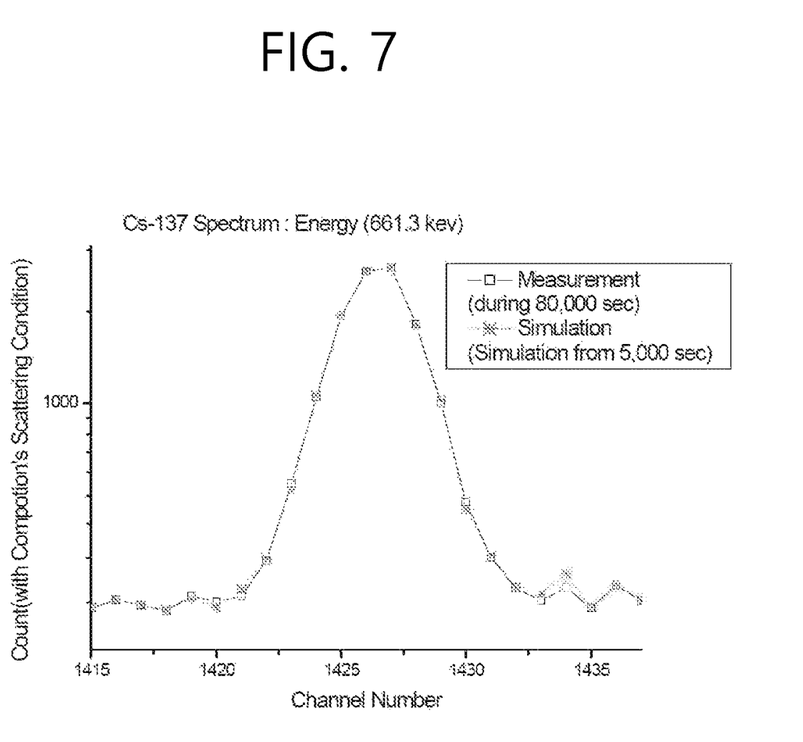

FIG. 6 and FIG. 7 show the measured spectra obtained according to the present invention.

Using initial measurement values of I-131 and Cs-137 radioactivity, it was checked that the simulated value is almost the same as that of the 80,000 seconds measurement.

The data set as used in the actual Monte Carlo application contained 5,000 time-scanning data based on the energy channels of the spectrum as collected on a unit time of one second basis. That is, the data measured for the early 5,000 seconds were used.

FIG. 6 shows the results of I-131 (637 keV). Random extractions of 5,000 pieces of data were repeated to create 80,000 pieces of simulated data, which were compared with the result of 80,000 seconds of actual last measurement. As shown in the figure, the simulation result and the actual measurement result are almost the same.

FIG. 7 shows the results of Cs-137 (661.3 keV). Random extractions of 5,000 pieces of data were repeated to create 80,000 pieces of simulated data, which were compared with the result of 80,000 seconds of actual last measurement. As shown in the figure, the simulation result and the actual measurement result are almost the same.

The foregoing embodiment is an example for describing the present invention, and the present invention is not limited thereto. It will be understood by those skilled in the art that various changes in form and details may be made therein without departing from the spirit and scope of the present invention as defined by the appended claims.

The invention claimed is:

1. A radioactivity measurement method comprising:
measuring radioactivity of a radioactive sample that comprises a radioactive nuclide while performing energy scanning and time scanning for a first time period, wherein:
  the energy scanning is performed in a state in which a measurement energy range is divided into a plurality of energy bands having the same band width and
  the time scanning is performed to count a number of times of radioactivity decays on a predetermined time duration basis and on each energy band basis;
generating a database from data sets about time-energy relationships obtained from the time scanning and energy scanning, wherein a decay characteristic of the radioactive nuclide is collected in the database; and
using a data extraction technique that includes a Monte Carlo technique, obtaining, from the database, a radioactivity measurement value for a second time period that is after the first time period by simulating the decay characteristic of the radioactive nuclide.

2. The radioactivity measurement method of claim 1, wherein the data sets constituting the database include 3,000 to 6,000 data sets.

* * * * *